United States Patent [19]

Gallagher, Jr.

[11] Patent Number: 5,704,998
[45] Date of Patent: Jan. 6, 1998

[54] HOT ROLLING HIGH-STRENGTH STEEL STRUCTURAL MEMBERS

[75] Inventor: Hugh M. Gallagher, Jr., Cincinnati, Ohio

[73] Assignee: Consolidated Metal Products, Inc., Cincinnati, Ohio

[21] Appl. No.: 532,534

[22] Filed: Sep. 22, 1995

Related U.S. Application Data

[63] Continuation-in-part of Ser. No. 275,841, Jul. 15, 1994, Pat. No. 5,454,888, which is a continuation-in-part of Ser. No. 91,640, Jul. 14, 1993, abandoned, which is a continuation-in-part of Ser. No. 827,740, Jan. 29, 1992, abandoned, which is a continuation-in-part of Ser. No. 602,675, Oct. 24, 1990, Pat. No. 5,094,698.

[51] Int. Cl.$^6$ .......................................... C21D 7/13
[52] U.S. Cl. .................. 148/648; 72/364; 72/700
[58] Field of Search .................... 148/648; 72/364, 72/700

[56] References Cited

U.S. PATENT DOCUMENTS

| | | |
|---|---|---|
| 1,862,281 | 6/1932 | Schaefer . |
| 2,767,836 | 10/1956 | Nachtman et al. . |
| 2,767,837 | 10/1956 | Nachtman et al. . |
| 2,880,855 | 4/1959 | Nachtman . |
| 2,953,794 | 9/1960 | Klooz . |
| 3,001,897 | 9/1961 | Nachtman . |
| 3,066,408 | 12/1962 | Fader . |
| 3,076,361 | 2/1963 | Epstein et al. . |
| 3,488,231 | 1/1970 | Zackay et al. . |
| 3,488,986 | 1/1970 | Stammbach . |
| 3,494,808 | 2/1970 | Goda et al. ............... 148/648 |
| 3,557,587 | 1/1971 | Cardillo . |
| 3,573,999 | 4/1971 | Gokyu . |
| 3,720,087 | 3/1973 | Gottschlich . |
| 3,877,281 | 4/1975 | Shimizu et al. . |
| 3,904,445 | 9/1975 | Gallagher, Jr. . |
| 3,908,431 | 9/1975 | Jones et al. . |
| 3,959,999 | 6/1976 | Filatov et al. . |
| 4,289,548 | 9/1981 | Bucher et al. . |
| 4,312,210 | 1/1982 | Nishizawa et al. . |
| 4,317,355 | 3/1982 | Hatsuno et al. . |
| 4,365,824 | 12/1982 | Ohno et al. . |
| 4,378,687 | 4/1983 | Shilov et al. . |
| 4,393,679 | 7/1983 | Kusaba . |
| 4,608,851 | 9/1986 | Khare . |
| 4,685,319 | 8/1987 | Aoyagi et al. . |
| 4,779,439 | 10/1988 | Baldi . |
| 4,805,437 | 2/1989 | Heil, Jr. et al. . |
| 4,958,508 | 9/1990 | Lin . |
| 4,966,026 | 10/1990 | Nishino . |
| 4,982,591 | 1/1991 | McGahhey . |
| 5,121,622 | 6/1992 | Kosak et al. . |
| 5,203,193 | 4/1993 | Iguchi et al. . |
| 5,287,715 | 2/1994 | Kusaba . |
| 5,392,624 | 2/1995 | Properzi . |
| 5,527,401 | 6/1996 | Kim ............................ 148/648 |

FOREIGN PATENT DOCUMENTS

| | | |
|---|---|---|
| 0093218A1 | 11/1983 | European Pat. Off. . |
| 2218399 | 2/1974 | France . |
| 51-144328A | 12/1976 | Japan . |
| 56-004612B | 1/1981 | Japan . |
| 58-027958 | 2/1983 | Japan . |
| 87222 | 5/1983 | Japan ............................ 148/648 |
| 9122 | 1/1984 | Japan ............................ 148/648 |
| 405051636 | 3/1993 | Japan ............................ 148/648 |

OTHER PUBLICATIONS

*High–Tensile Bolts* by Kobe Steel, Chemical Abstracts No. 101411b, vol. 95 (1981.09) No. 12, p. 219 (Sep. 21,1981).
*Warm Working of Steel* by Isao Gokyu and Teruo Kishi, Japanese Inst. of Metal, vol. 9, Supp. (1968).
*Strengthening of Warm–Rolled Low–Carbon Steels* by M. L. Bernshtein and N. V. Filatova, 2354 *Metal Science and Heat Treatment* 26, pp.128–131 (Feb. 1, 1984).
*Materials Science and Engineering*, Second Edition, by Carl A. Keyser, pp. 236–237 (1974).
*Warm Extrusion of Free–Cutting Steels* by E. Nehl, CA102(22): 888 63K American Chem. Society (1984).

Primary Examiner—Deborah Yee
Attorney, Agent, or Firm—Wood, Herron & Evans, L.L.P.

[57] ABSTRACT

High strength steel structural members and a method of making same are disclosed by providing high-strength steel material having a specific chemical composition and preferably a tensile strength of at least about 120,000 psi and a yield strength of at least about 90,000 psi and hot rolling the steel material to provide the structural member of desired geometric configuration.

14 Claims, No Drawings

HOT ROLLING HIGH-STRENGTH STEEL STRUCTURAL MEMBERS

RELATED APPLICATIONS

This is a continuation-in-part of application Ser. No. 08/275,841 filed Jul. 15, 1994, now U.S. Pat. No. 5,454,880 which in turn was a continuation-in-part of application Ser. No. 08/091,640, fled Jul. 14, 1993, now abandoned which in turn was a continuation-in-part of application Ser. No. 07/827,740, filed Jan. 29, 1992, now abandoned which in turn was a continuation-in-part of application Serial No. 07/602,675, filed Oct. 24, 1990, now U.S. Pat. No. 5,094,698, issued on Mar. 10, 1992, which was the parent of application Ser. No. 07/848,646, filed Mar. 9, 1992, now U.S. Pat. No. 5,236,520, issued on Aug. 17, 1993 which was the parent application of Ser. No. 08/992,123, filed Dec. 17, 1992, now U.S. Pat. No. 5,330,594, which was the parent application of Ser. No. 08/276,217, filed Jul. 15, 1994. Each of the foregoing are hereby incorporated by reference herein.

FIELD OF THE INVENTION

The present invention relates to a method of making high-strength steel structural members, and more particularly it relates to a method in which a blank of high-strength steel is hot rolled or forged into a structural member having a desired geometric cross-sectional configuration while maintaining the high-strength properties of the steel blank.

BACKGROUND OF THE INVENTION

High strength steel parts and structural members have been formed using cold forging techniques which are well known in the art. There are drawbacks to cold forming parts and structural members. Since the member or part is formed at or about room temperature, the reshaping or forming steps require substantially higher forces. This frequently necessitates a series of cold forming steps in which the material is sequentially formed into the desired shape. This increases die wear and noise associated with such processes. Furthermore, as the material is worked, the strength of the member or part increases. If it is worked to a substantial degree, the resulting increase in strength requires annealing to lower the strength which adds to the time and cost of such processes.

To avoid the above drawbacks, warm forging may be utilized to form structural members and parts from materials at an intermediate temperature which is high enough to reduce the strength of the material and thereby facilitate forming, and yet is below the hot forging temperature at which recrystalization, scaling and decarburization occurs. Examples of patents which disclose processes for rolling or forming members to obtain specific configurations and desired mechanical properties include U.S. Pat. Nos. 5,287,715; 5,203,193; 5,121,622; 4,982,591; 4,966,026; 4,685,319; and 4,378,687.

No representation is made that any of the above cited references fairly represent the prior art or that such references are the most material references. These patents disclose complicated and involved processes including repeated forming and cooling steps in many instances for forming structural members which may prove to be expensive and require involved steps to obtain finished members with the desired mechanical properties.

There has heretofore been lacking a method of making a high-strength steel structural member from a blank of steel having a specific composition and possessing desired high-strength properties, which method includes a hot forging or rolling step whereby the blank is formed into a desired shape and whereby the mechanical properties of the structural member may remain substantially the same or greater than those originally possessed by the blank, and in which the member may be produced without additional strengthening processing steps to impart mechanical strength properties thereto.

SUMMARY OF THE INVENTION

The method of the present invention is useful for producing a wide variety of high-strength steel structural members from high-strength steel blanks. In particular, this invention is directed to the formation of an elongated high strength steel member having a uniform cross-sectional configuration over at least a portion and often substantially all of its entire length. For example, structural members having an O, L, C, Z, T, I, W, U, V shapes and other members are susceptible to forming by the hot forging or rolling process disclosed herein.

The structural member of this invention is a finished product and has at least one flange included in its cross-sectional configuration. The flange is a member which has a thickness less than an overall outer dimension of the cross-sectional configuration and provides increased load bearing capability to the structural member.

The present invention is directed to a method of making high-strength steel structural members from high-strength steel material having a tensile strength of at least about 120,000 psi and a yield strength of at least about 90,000 psi. In one of its aspects, the present invention provides a method of making high-strength steel structural members from high-strength steel material by hot forging or rolling the steel material to provide a structural member having a desired geometric configuration, whereby the mechanical properties of tensile strength and yield strength of the member are substantially the same as or greater than the steel material. The formed structural member is then cooled or quenched, preferably at a controlled rate, without changing its configuration by distortion of the like which may otherwise result from the cooling.

The present invention also provides a method of making high-strength steel structural members including hot forging, rolling or otherwise forming high-strength steel material whereby the mechanical properties of tensile strength and yield strength of the member are substantially the same as or greater than the material used to form the member and wherein the member, with the desired mechanical properties of tensile strength and yield strength, is produced without further strengthening processing steps.

The principles of this invention, its objectives and advantages will be further understood with reference to the following detailed description.

DETAILED DESCRIPTION OF THE INVENTION

The present invention is directed to the production of a structural member which is elongate with a uniform cross-sectional configuration over at least a portion of and typically a substantial portion of its length and which includes at least one flange. The flange is a member which has a thickness less than an overall perimeter or outer dimension of the cross-sectional configuration (i.e., the width, height, or outer diameter of the structural member). The flange distinguishes the structural member from a blank in that the flange provides increased load bearing capability to the member. In other words, the structural member has more load bearing capability with the flange than a member without the flange having the same material composition and properties as the structural member. The load may be axial as in an end-on load, lateral as in a side load or any other type of load applied to the structural member. In contrast, the high strength steel material prior to the rolling is typically a newly formed billet of molten or cooled metal which may be in some other typically monolithic configuration used in continuous casting processes or the like.

The flange is integrally formed either continuously or discontinuously with respect to the remainder of the structural member. Examples of discontinuous flanges are the upper and lower potions of an I-shaped beam with respect to the center potion or of either leg of an L-shaped truss with respect to the other leg of the tress. An example of a continuous flange is any chord or portion of the cross-sectional configuration of an O-shaped structural member. Examples of structural members having at least one flange are O, L, C, Z, I, T, U, V, and W shaped members.

In a preferred embodiment, the method of the present invention for making a high-strength steel structural member includes providing high-strength steel material having a tensile strength of at least about 120,000 psi, and preferably at least about 150,000 psi, and a yield strength of at least about 90,000 psi, and preferably at least about 130,000 psi. In one form, the high-strength steel material utilized has been hot reduced and cold drawn to provide a billet or blank having the mechanical properties of tensile strength and yield strength stated above. The high strength material used for the formation of the structural member in one form may be processed in molten, softened or hardened form and in another form may be a billet or blank to be hot rolled according to this invention.

The high-strength steel material may be exemplified by the following composition, by weight percent:

carbon about 0.30 to about 0.65% manganese about 0.30 to about 2.5% at least 1 ferrous grain refiner from the group consisting of aluminum, niobium, titanium and vanadium, and mixtures thereof, in an effective amount for grain refining up to about 0.35% iron balance.

In a more preferred form, the high-strength steel material has the following composition, by weight percent:

carbon about 0.40 to about 0.55% manganese about 0.30 to about 2.5% at least 1 ferrous grain refiner from the group consisting of aluminum, niobium, titanium and vanadium, and mixtures thereof, in an effective amount for grain refining up to about 0.20% iron balance.

In a still more preferred form, the high-strength steel material has the following composition, by weight percent:

carbon about 0.50 to about 0.55% manganese about 1.20 to about 1.65% at least 1 ferrous grain refiner from the group consisting of aluminum, niobium, titanium and vanadium, and mixtures thereof, in an effective amount for grain refining of about 0.03 to about 0.20% iron balance.

While aluminum, niobium (i.e., columbium), titanium and vanadium act as grain refiners, vanadium is the most preferred of the grain refiners. Furthermore, it should be understood that the compositions listed and claimed herein may include other elements which do not impact upon the practice of this invention.

The high-strength steel material having a tensile strength of at least about 120,000 psi and a yield strength of at least about 90,000 psi, which is used as the starting piece in the method of the present invention is produced by any suitable method known in the art.

The steel material, having a composition and mechanical properties of tensile strength and yield strength as given above, is thereafter hot rolled, forged or otherwise formed at a temperature over the recrystalization temperature, typically about 2000° F. to provide a structural member having a desired geometric configuration. The temperature at which the structural member is rolled is related to the chemical composition of the steel material used. With the above described chemical composition, the hot rolled structural member may have a large martensite content depending on the cooling rate. The rolled structural member, with the mechanical properties of tensile strength and yield strength given, may be produced without any further strengthening processing steps subsequent to the hot forging thereof.

The benefits of this invention are achieved once the steel of the proper composition has been rolled at the proper temperature. The hot rolled steel may then be allowed to cool, preferably at an accelerated and controlled rate, to room temperature from the rolling temperature. Alternatively, the rolled steel may be quenched in oil or water and then tempered if it has a significant martensite content to reduce brittleness in the resulting structural member.

The following example illustrates the practice of the present invention to produce a structural member from high-strength steel material produced in accordance with the method described above.

EXAMPLE

A high-strength AISI 1552 steel stock had the following composition by weight:

| | |
|---|---|
| Carbon | 0.52% |
| Manganese | 1.43% |
| Phosphorous | 0.009% |
| Sulphur | 0.017% |
| Silicon | 0.22% |
| Vanadium | 0.075% |
| Chromium | 0.05% |
| Molybdenum | 0.01% |
| Iron | balance. |

The stock was tested to have a tensile strength of 130,100 psi and a yield strength of 95,120 psi. The stock was then hot rolled at a temperature of about 2000° F. under 65,000 lbf into an I-beam structural member having a center section with a thickness of 0.177" and top and bottom flanges each with a tapered thickness ranging from 0.23" to about 0.16". The overall height of the I-beam was 2.64" and the overall width was the same width as each flange, specifically 1.825". A 0.125" radius fillet joined each face of the center section to each flange. The I-beam was tested to have a tensile strength of about 133,000 psi and a yield strength of about 89,000 psi.

The mechanical properties of tensile strength and yield strength of the finished I-beam structural member are substantially the same as or greater than that originally possessed by the stock, and therefore, no further strengthening processing steps are required. The finished member also has enough of the desired mechanical property of ductility originally possessed by the bar stock or billet that the need for further processing steps to improve toughness can generally be eliminated.

Compared to prior methods which used a heat treating process (i.e., austenitizing, hardening by quenching and tempering), especially when the heat treatment was used after cold forming to produce the desired high-strength mechanical properties of the member, finished structural members made according to the present invention are more likely to consistently have mechanical properties which fall within a narrower range. Thus, the present invention is more likely to consistently produce higher strength steel structural members within a narrower range due primarily to the composition of the steel material.

The scope of the present invention is not intended to be limited by the examples provided herein, but rather is defined by the appended claims.

What is claimed is:

1. A method of making a high-strength steel structural member comprising the steps of:

providing high-strength steel material having a tensile strength of at least about 120,000 psi and a yield strength of at least about 90,000 psi, wherein the high-strength steel material comprises, by weight percent:
   carbon about 0.30 to about 0.65%
   manganese about 0.30 to about 2.5%
   at least 1 grain refiner from the group consisting of aluminum, niobium, titanium and vanadium, and mixtures thereof, in an effective amount for grain refining up to about 0.35% iron balance; and hot rolling the high strength steel material to provide a structural member having a uniform cross-sectional configuration over at least a portion of its length, said uniform cross-sectional configuration being different than a configuration of said material and including at least one flange having a thickness less than an overall perimeter dimension of said cross-sectional configuration, said at least one flange providing increased load bearing capacity to said structural member.

2. The method of claim 1 wherein said mechanical properties of tensile strength and yield strength of said structural member are produced without further processing steps to strengthen said structural member.

3. The method of claim 1 wherein the high-strength steel material comprises, by weight percent:
   carbon about 0.40 to about 0.55%
   manganese about 0.30 to about 2.50%
   at least 1 grain refiner from the group consisting of aluminum, niobium, titanium and vanadium, and mixtures thereof, in an effective amount for grain refining up to about 0.20% iron balance.

4. The method of claim 1 wherein the high-strength steel material comprises, by weight percent:
   carbon about 0.50 to about 0.55%
   manganese about 1.20 to about 1.65%
   at least 1 grain refiner from the group consisting of aluminum, niobium, titanium and vanadium, and mixtures thereof, in an effective amount for grain refining about 0.03 to about 0.20% iron balance.

5. The method of claim 1 wherein said hot rolling is carried out at a temperature above about 2000° F.

6. The method of claim 1 wherein said uniform cross-sectional configuration is selected from the group consisting of O, L, C, Z, I, T, U, V, and W shapes.

7. The method of claim 1 further comprising:
   cooling said structural member at an accelerated and controlled cooling rate.

8. The method of claim 1 wherein said grain refiner is vanadium.

9. A method of making a high-strength steel structural member comprising the steps of:

providing high-strength steel material having at least partially a martensite microstructure and a tensile strength of at least about 120,000 psi and a yield strength of at least about 90,000 psi;
   wherein the high-strength steel material comprises, by weight percent:
   carbon about 0.30 to about 0.65%
   manganese about 0.30 to about 2.5%
   at least 1 grain refiner from the group consisting of aluminum, niobium, titanium and vanadium, and mixtures thereof, in an effective amount for grain refining up to about 0.35% iron balance; and hot rolling the steel material to provide a structural member having a uniform cross-sectional configuration over at least a portion of its length, said uniform cross-sectional configuration including at least one flange having a thickness less than an overall perimeter dimension of said cross-sectional configuration, said at least one flange providing increased load bearing capacity to said structural member.

10. The method of claim 9 wherein the high-strength steel material comprises, by weight percent:
    carbon about 0.50 to about 0.55%
    manganese about 1.20 to about 1.65%
    at least 1 grain refiner from the group consisting of aluminum, niobium, titanium and vanadium, and mixtures thereof, in an effective amount for grain refining about 0.03 to about 0.20% iron balance.

11. The method of claim 9 wherein said uniform cross-sectional configuration is selected from the group consisting of O, L, C, Z, I, T, U, V, and W shapes.

12. The method of claim 9 further comprising:
    cooling said structural member at an accelerated and controlled cooling rate.

13. The method of claim 9 wherein said grain refiner is vanadium.

14. A method of making a high-strength steel structural member comprising the steps of:

providing high-strength steel material having a tensile strength of at least about 120,000 psi and a yield strength of at least about 90,000 psi, said high-strength steel material comprising, by weight percent:
    carbon about 0.50 to about 0.55%
    manganese about 1.20 to about 1.65%
    at least 1 grain refiner from the group consisting of aluminum, niobium, titanium and vanadium, and mixtures thereof, in an effective amount for grain refining about 0.03 to about 0.20% iron balance;

hot rolling the steel material at a temperature above about 2000° F., to provide a structural member having a uniform cross-sectional configuration over at least a portion of its length, said uniform cross-sectional configuration including at least one flange having a thickness less than an overall perimeter dimension of said cross-sectional configuration, said at least one flange providing increased load bearing capacity to said structural member, said uniform cross-sectional configuration being selected from the group consisting of O, L, C, Z, I, T, U, V, and W shapes; and cooling said structural member.

* * * * *